US008694957B2

(12) United States Patent
Lou et al.

(10) Patent No.: US 8,694,957 B2
(45) Date of Patent: Apr. 8, 2014

(54) METHOD AND APPARATUS FOR AN XML REPORTER

(75) Inventors: Edmund G. Lou, San Jose, CA (US); Rajkumar Premkumar, Santa Clara, CA (US)

(73) Assignee: Oracle America, Inc., Redwood City, CA (US)

( * ) Notice: Subject to any disclaimer, the term of this patent is extended or adjusted under 35 U.S.C. 154(b) by 1633 days.

(21) Appl. No.: 11/833,773

(22) Filed: Aug. 3, 2007

(65) Prior Publication Data

US 2007/0271294 A1 Nov. 22, 2007

Related U.S. Application Data

(62) Division of application No. 10/079,119, filed on Feb. 19, 2002, now Pat. No. 7,249,133.

(51) Int. Cl.
*G06F 9/44* (2006.01)
*G06F 15/16* (2006.01)

(52) U.S. Cl.
USPC .......................................... 717/109; 709/218

(58) Field of Classification Search
USPC .......................... 707/1–10; 717/109; 709/218
See application file for complete search history.

(56) References Cited

U.S. PATENT DOCUMENTS

| 6,658,625 | B1 * | 12/2003 | Allen | 715/236 |
| 6,781,609 | B1 * | 8/2004 | Barker et al. | 715/760 |
| 7,020,797 | B2 * | 3/2006 | Patil | 714/4 |
| 2002/0049760 | A1 * | 4/2002 | Scott et al. | 707/10 |

* cited by examiner

*Primary Examiner* — Hosain Alam
*Assistant Examiner* — Navneet K Ahluwalia
(74) *Attorney, Agent, or Firm* — Martine Penilla Group, LLP

(57) ABSTRACT

An invention is provided for generating an XML test result file. A key parameter and a value parameter are received, wherein the key parameter relates to a tag. A first string is then generated based on the key parameter and the value parameter. Included in the first string is a first beginning tag and a first ending tag, each based on the key parameter. In addition, the first string includes the value parameter positioned between the first beginning tag and the first ending tag. The first string is then inserted into a test results file that stores a second string that has a second beginning tag and a second ending tag. In particular, the first string is inserted between the second beginning tag and a second ending tag. By continuing in this manner, an XML test results file can be generated using the embodiments of the present invention.

14 Claims, 8 Drawing Sheets

```
<?xml version= "1.0" standalone= "yes"?>

┌── 400'
                                                                                            ↓

402──▶ <!DOCTYPE rootreport     [
       <!ELEMENT rootreport              (toolreport+)                                              >
404──▶ <!ELEMENT toolreport              (testarea+, toolname, tooldescription,
                                          systeminfo, toolreportcustom*, testcase+,
                                          datestamp?, author?, executioner?, executiontime?)       >
       ┌ <!ELEMENT testarea              (#PCDATA)                                                  >
       │ <!ELEMENT toolname              (#PCDATA)                                                  >
       │ <!ELEMENT tooldescription       (#PCDATA)                                                  >
       │ <!ELEMENT toolreportcustom      (#PCDATA)                                                  >
 406 ⟨   <!ATTLIST  toolreportcustom     key      CDATA       #REQUIRED                             >
       │ <!ELEMENT datastamp             (#PCDATA)                                                  >
       │ <!ELEMENT author                (#PCDATA)                                                  >
       │ <!ELEMENT executioner           (#PCDATA)                                                  >
       └ <!ELEMENT executiontime         (#PCDATA)                                                  >
412──▶ <!ELEMENT testcase                (testcasecustom*, description, result, bugid*,
                                          notes?, testcase*)                                       >
       ┌ <!ELEMENT testcasecustom        (#PCDATA)                                                  >
       │ <!ATTLIST  testcasecustom       key      CDATA       #REQUIRED                             >
       │ <!ELEMENT description           (#PCDATA)                                                  >
 414 ⟨   <!ELEMENT result                (#PCDATA)                                                  >
       │ <!ELEMENT bugid                 (#PCDATA)                                                  >
       └ <!ELEMENT notes                 (#PCDATA)                                                  >
408──▶ <!ELEMENT systeminfo              (javaversion, osname, osversion, i18n, ipaddress?,
                                          vmflags*, osmode?, systeminfocustom*)                    >
       ┌ <!ELEMENT javaversion           (#PCDATA)                                                  >
       │ <!ELEMENT osname                (#PCDATA)                                                  >
       │ <!ELEMENT osversion             (#PCDATA)                                                  >
       │ <!ELEMENT ipaddress             (#PCDATA)                                                  >
 410 ⟨   <!ELEMENT vmflags               (#PCDATA)                                                  >
       │ <!ELEMENT osmode                (#PCDATA)                                                  >
       │ <!ELEMENT systeminfocustom      (#PCDATA)                                                  >
       └ <!ATTLIST  systeminfocustom     key      CDATA       #REQUIRED                             >
         <!ELEMENT i18n                  (locale, timezone?, language, encoding?,
                                          i18ncustom*)                                             >
         <!ELEMENT locale                (#PCDATA)                                                  >
         <!ELEMENT timezone              (#PCDATA)                                                  >
         <!ELEMENT language              (#PCDATA)                                                  >
         <!ELEMENT encoding              (#PCDATA)                                                  >
         <!ELEMENT i18ncustom            (#PCDATA)                                                  >
         <!ATTLIST  i18ncustom           Key      CDATA       #REQUIRED                             >
       ]>
```

FIG. 5

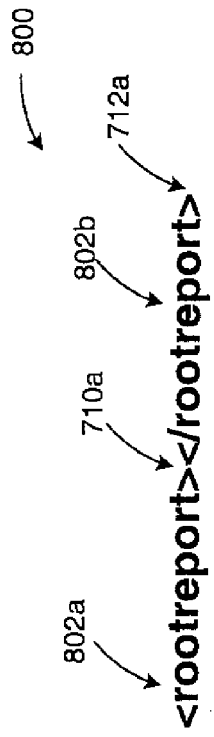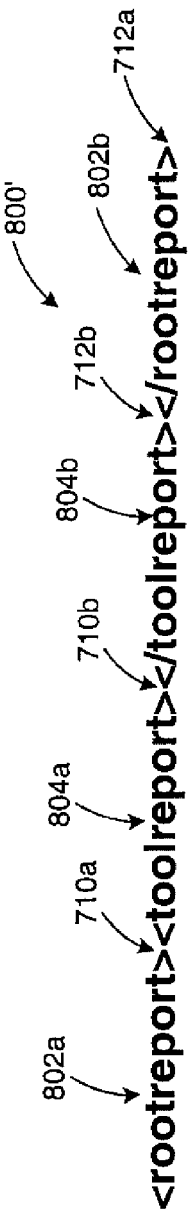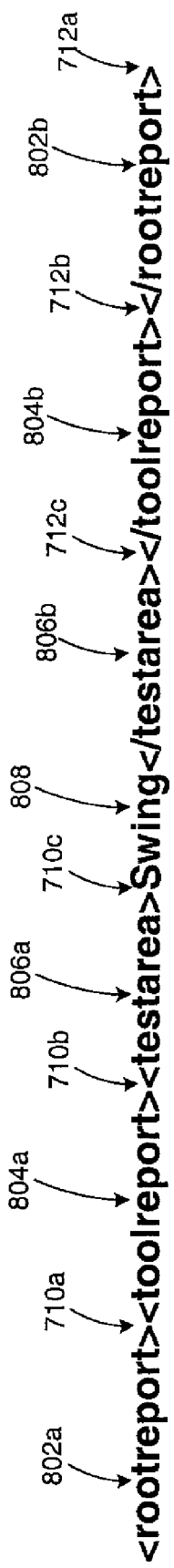

METHOD AND APPARATUS FOR AN XML REPORTER

CROSS REFERENCE TO RELATED APPLICATION

This application is a divisional application of U.S. patent application Ser. No. 10/079,119, filed on Feb. 19, 2002 now U.S. Pat. No. 7,249,133, and entitled, "METHOD AND APPARATUS FOR A REAL-TIME XML REPORTER." The disclosure of this application is incorporated herein by reference for all purposes.

BACKGROUND OF THE INVENTION

1. Field of the Invention

This invention relates generally to computer testing, and more particularly to real-time XML based test report generation.

2. Description of the Related Art

Software applications typically undergo constant review and improvement, which verifies the functions of the software and updates the software to incorporate new features and functions. However, each new feature and error fix may cause addition errors. As such, test engineers generally apply a series of test cases, known as a test suite, to the application to test each new update and error fix. A typical test suite can include thousands of individual test cases.

For example, in a Java™ application, a test case generally includes an assertion, such as pushing a button, followed by an occurrence of a particular event. In addition, the test case validates the occurrence of the event, verifying whether the event occur correctly. For example, a test case can verify the function of a "tone" button on an Internet web page application. When the tone button is pressed, a tone should be produced. The test case simulates a computer mouse dragging a cursor to the button, pressing the button, and then releasing the button. The test case then validates whether the tone was correctly produced. Finally, a test result is output to a test report, which includes at least one test result for each one of the test cases.

Often, test reports are output in a text format so that software test engineers can review the test results in a written form. However, unformatted text-based test reports can be difficult for a human engineer to read. To make test reports easier to read, test suites often output the test reports in a Hypertext Markup Language (HTML) format, rather than an unformatted text format. HTML format allows a user to view the data using a browser application, which renders the data is easy for a human to read.

Conventional test applications typically use an HTML reporter to convert test results into HTML format. HTML surrounds data with tags that define how a browser should present the data to a user. Hence, an HTML test report file represents a view of the test result data, rather than the data itself. As such, an HTML test report file cannot easily be displayed in different views without severely altering the tags and other content of the HTML file. Thus, if a specific view of the test result data is needed, the new data view cannot be easily created without severely altering the HTML test report file.

Different users often require different views of the test report data. For example, a department manager may require a listing of test regressions, while an application designer may require a listing of all test failures. Using an HTML based test report file, these two data views generally cannot be easily created using the same HTML test report file. Creating these views typically requires the HTML test report file to be examined and altered to create new HTML files, which include only the information requested.

In view of the foregoing, there is a need for techniques that produce test report files in manner that can be viewed in multiple fashions without requiring substantial altering of the test report file. In addition, the methods should produce test report data in real-time, thus reporting test results as they occur to reduce the impact of system crashes that occur during application testing.

SUMMARY OF THE INVENTION

Broadly speaking, the present invention fills these needs by providing an Extensible Markup Language (XML) reporter that writes test results in real-time to a test report file. In one embodiment, a method is disclosed for generating an XML test result file. A key parameter and a value parameter are received, wherein the key parameter relates to a tag. A first string is then generated based on the key parameter and the value parameter. Included in the first string is a first beginning tag and a first ending tag, each based on the key parameter. In addition, the first string includes the value parameter positioned between the first beginning tag and the first ending tag. The first string is then inserted into a test results file that stores a second string, which includes a second beginning tag and a second ending tag. In particular, the first string is inserted between the second beginning tag and a second ending tag. By continuing in this manner, a well formed and valid XML test results file can be generated using the embodiments of the present invention.

In a further embodiment, a computer program embodied on a computer readable medium is disclosed for generating an XML test result file. The computer program includes a code segment that receives a key parameter and a value parameter. As above, the key parameter relates to a tag. In addition, the computer program includes a code segment that generates a first string based on the key parameter and the value parameter, the first string including a first beginning tag and a first ending tag based on the key parameter. The first string also includes the value parameter, which is positioned between the first beginning tag and the first ending tag. The computer program further includes a code segment that inserts the first string into a test results file that stores a second string having a second beginning tag and a second ending tag is also included. As above, the first string is inserted between the second beginning tag and a second ending tag.

A system for generating an XML test result file is disclosed in a further embodiment of the present invention. The system includes an application program that includes application testing instructions, which are capable of generating test result data. In addition, an XML reporter object is included that is in communication with the application program. The XML reporter object receives the test result data from the application program, and processes the test result data to generate an XML based string. The system further includes an XML test results file that is in communication with the XML reporter object. In operation, the XML reporter inserts the XML based string into the XML test results file. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

FIG. 5 is a chart showing the exemplary test results DTD format for an XML test results file in text format, in accordance with an embodiment of the present invention;

FIG. 8A is an illustration showing an exemplary "rootreport" entry, in accordance with an embodiment of the present invention;

FIG. 8B is an illustration showing an exemplary entry including "toolreport," in accordance with an embodiment of the present invention;

FIG. 8C is an illustration showing an exemplary entry including "testarea," in accordance with an embodiment of the present invention.

DETAILED DESCRIPTION OF THE PREFERRED EMBODIMENTS

An invention is disclosed for an Extensible Markup Language (XML) reporter that writes test results in real-time to a test report file. In this manner, embodiments of the present invention generate test report files capable of being viewed in multiple fashions using the same test report file. Further, the real-time writing reduces the impact of system crashes that occur during testing. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
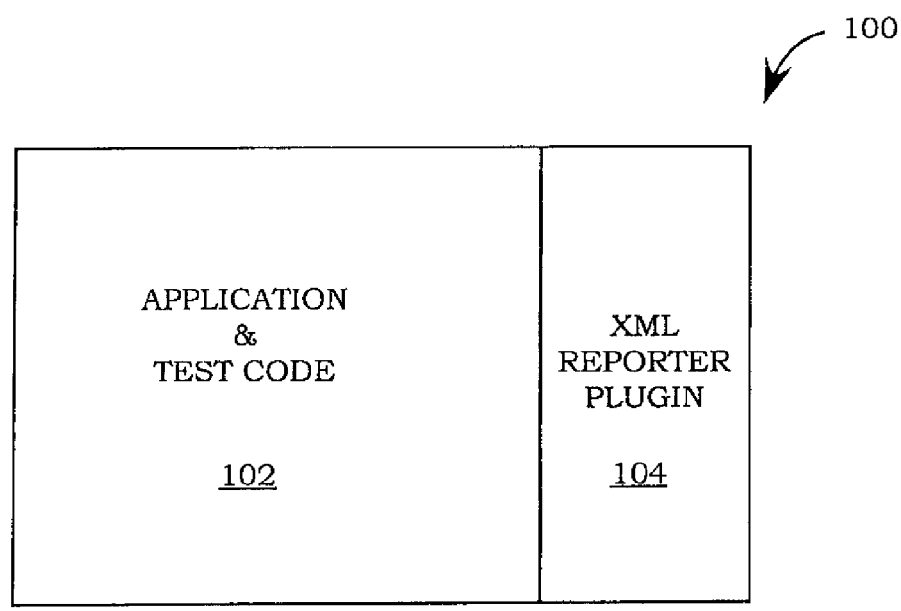
FIG. 1 is a block diagram showing an exemplary application testing configuration, in accordance with an embodiment of the present invention.

FIG. 1 is a block diagram showing an exemplary application testing configuration 100, in accordance with an embodiment of the present invention. The application testing configuration 100 includes an application program 102 that includes additional testing code. To test applications, test engineers often insert testing code directly into the application. The application is then executed and the test results recorded. However, it should be noted that other testing techniques can be utilized with the embodiments of the present invention. For example, a separate test application can be developed that exercises the application under test. Generally, such test applications make function calls to the functions of the application under test to determine if proper events occur.

In addition to the application program 102, an XML reporter plug-in 104 is provided. A plug-in is auxiliary program that works with another software element to enhance its capability. For example, plug-ins are widely used in image editing programs to add a filter for some special effect. Plug-ins are also often added to Web browsers to enable them to support new types of content, such as audio and video.

The XML reporter plug-in 104 extends the application under test to provide a mechanism for writing test results to a test report file in XML format. XML is an open standard for describing data and is often used for defining data elements on a Web page and business-to-business documents. XML uses a similar tag structure as HTML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function similar to database records. It should be noted that the XML reporter 104 can be embodied in formats other than a plug-in, as shown in FIG. 1. For example, the XML reporter can comprise a separate program that executes in parallel with the application being test. In such as case, the XML report can intercept write request by the application being tested, or be interfaced with the application, depending on the needs of the application test engineer.

Figure 2:
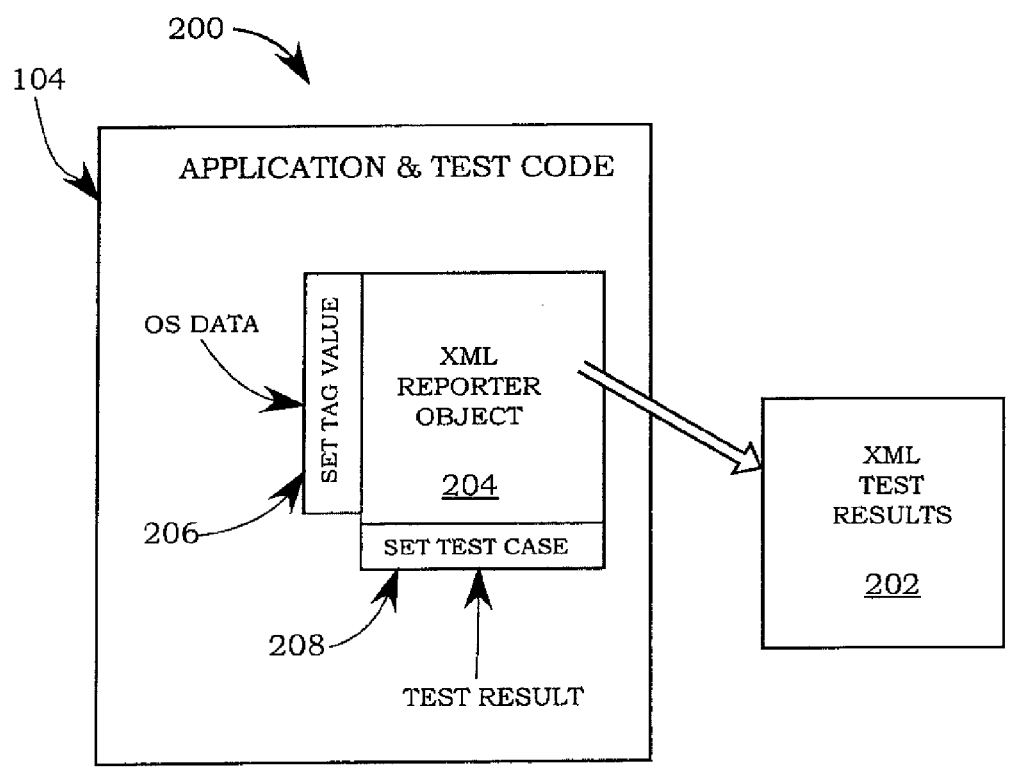
FIG. 2 is a block diagram showing an exemplary application testing system, in accordance with an embodiment of the present invention.

FIG. 2 is a block diagram showing an exemplary application testing system 200, in accordance with an embodiment of the present invention. The application testing system 200 includes the application 102 that is being tested and an XML test results file 202. As above, the testing code can be inserted directly into the application 104. However, it should be borne in mind that other testing techniques can be utilized with the embodiments of the present invention, as mentioned previously. In addition, the application 104 includes an XML reporter object 204 having a set tag value application program interface (API) 206 and a set test value API 208. As mentioned above, an XML reporter of the embodiments of the present invention can be implemented as a plug-in that extends the functionality of the application 104 being tested.

In one embodiment, the XML reporter plug-in provides an XML reporter class usable by the application 104. In this embodiment, the test code in the application 104 can create an XML object 204 that provides additional functions for creating the XML test results file 202. The XML reporter object 204 provides, in one embodiment, two interfaces for communicating with the application program 104, namely, the set tag value API 206 and a set test value API 208.

The set tag value API 206 provides a mechanism for writing simple values to the XML test results file 202. In particular, the set tag value API receives a key and a value from the application 104, and writes the received key and value to the XML test results file 202 in proper XML format. The key is the tag name that identifies the corresponding value, while the value is the actual data corresponding the test being performed on the application 104.

Figure 3A:
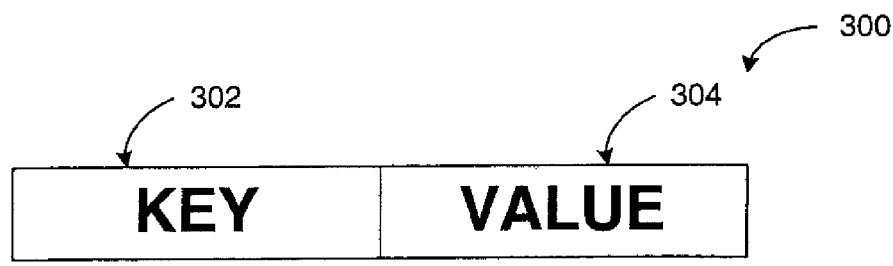
FIG. 3A is a block diagram showing parameters for the set tag value API, in accordance with an embodiment of the present invention.

FIG. 3A is a block diagram showing parameters 300 for the set tag value API, in accordance with an embodiment of the present invention. The parameters 300 include a key 302 and a corresponding value 304. As mentioned above, the key 302 is the tag name that identifies the corresponding value 304, while the value 304 is the actual data corresponding the test being performed on the application.

Figure 3B:
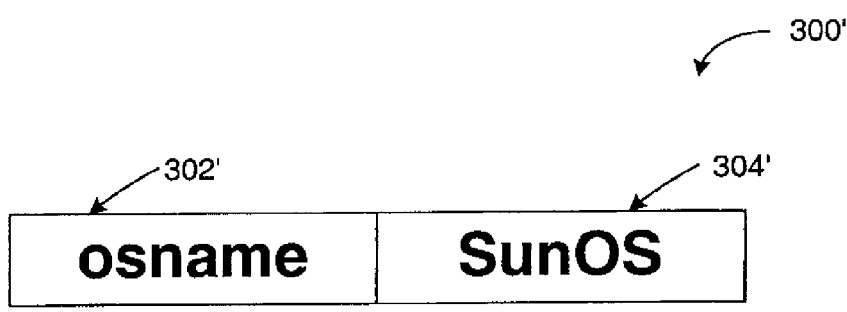
FIG. 3B is a block diagram showing exemplary parameters, in accordance with an embodiment of the present invention.

For example, FIG. 3B is a block diagram showing exemplary parameters 300', in accordance with an embodiment of the present invention. The parameters 300' include a key 302', which is "osname," and a corresponding value 304', which is "SunOS." Thus, the parameters 300' set the tag "osname" to have a value of "SunOS," indicating that the test was executed on a SUN MICROSYSTEMS operating system. The XML reporter object then processes the parameters 300' and writes the data to the XML test results file in proper XML format, as shown in FIG. 3C.

Figure 3C:
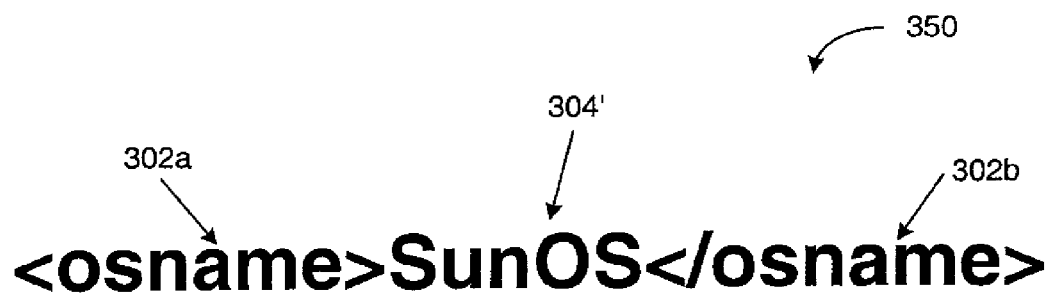
FIG. 3C is an illustration showing an exemplary XML entry, in accordance with an embodiment of the present invention.

FIG. 3C is an illustration showing an exemplary XML entry 350, in accordance with an embodiment of the present invention. As mentioned above, The XML reporter object processes the parameters 300' and writes the data to the XML test results file in proper XML format. Continuing the example of FIG. 3B, the XML reporter object uses the key "osname" to create a beginning tag <osname> 302a, and an ending tag </osname> 302b. In addition, between the beginning tag 302a and the ending tag 302b, the XML reporter writes the value "SunOS" 304'. In this manner, an XML parser can be used to determine what operating system was used during the application test.

Referring back to FIG. 2, the XML reporter object 204 also includes a set test case API 208. The set test case API 208 receives a hash table including keys and related values for data related to a particular test case, including sub-test cases. A hash table includes a plurality of records identified by key values. A hash function is then utilized to produce a table address when supplied with a key. The hash function is a mathematical function that transforms a variable-sized amount of text into a fixed-sized output, which is the hash value. In this manner, keys can be stored and retrieved to and from the hash table without requiring the entire table to be searched for the key value. Instead, the key is processed by the hash function to obtain a table address that is used to access the data related to the key. Using a hash table as input to the set test case API 208 allows test cases to be nested.

The XML reporter object 204 continuously updates the XML test results file 202 in real-time, that is, as the test cases are performed and information is provided to the XML reporter object 204 from the application 104. In this manner, test results obtained up to the point in which a crash occurs during testing remain available for review. Thus, the XML test results file 202 can be examined to determine the point in the test where the crash occurred so the test can be restarted from that point.

As mentioned above, the XML reporter object 204 generates the test results in XML format, which provides a flexible database for the test results data. The human-readable XML tags provide a simple data format, which is defined in a document type definition (DTD) format that defines content type as well as name. Thus, unlike HTML, which uses a rather loose coding style and which is tolerant of coding errors, XML pages are "well formed," which means they comply with rigid rules.

An XML document primarily comprises a strictly nested hierarchy of elements with a single root. Elements can contain character data, child elements, or a mixture of both. In addition, they can have attributes. Child character data and child elements are strictly ordered, while attributes are not. The names of the elements and attributes and their order in the hierarchy (among other things) form the XML markup language used by the document, also known as the "validity" of the document. This language can be defined by the document author or it can be inferred from the document's structure.

Figure 4:
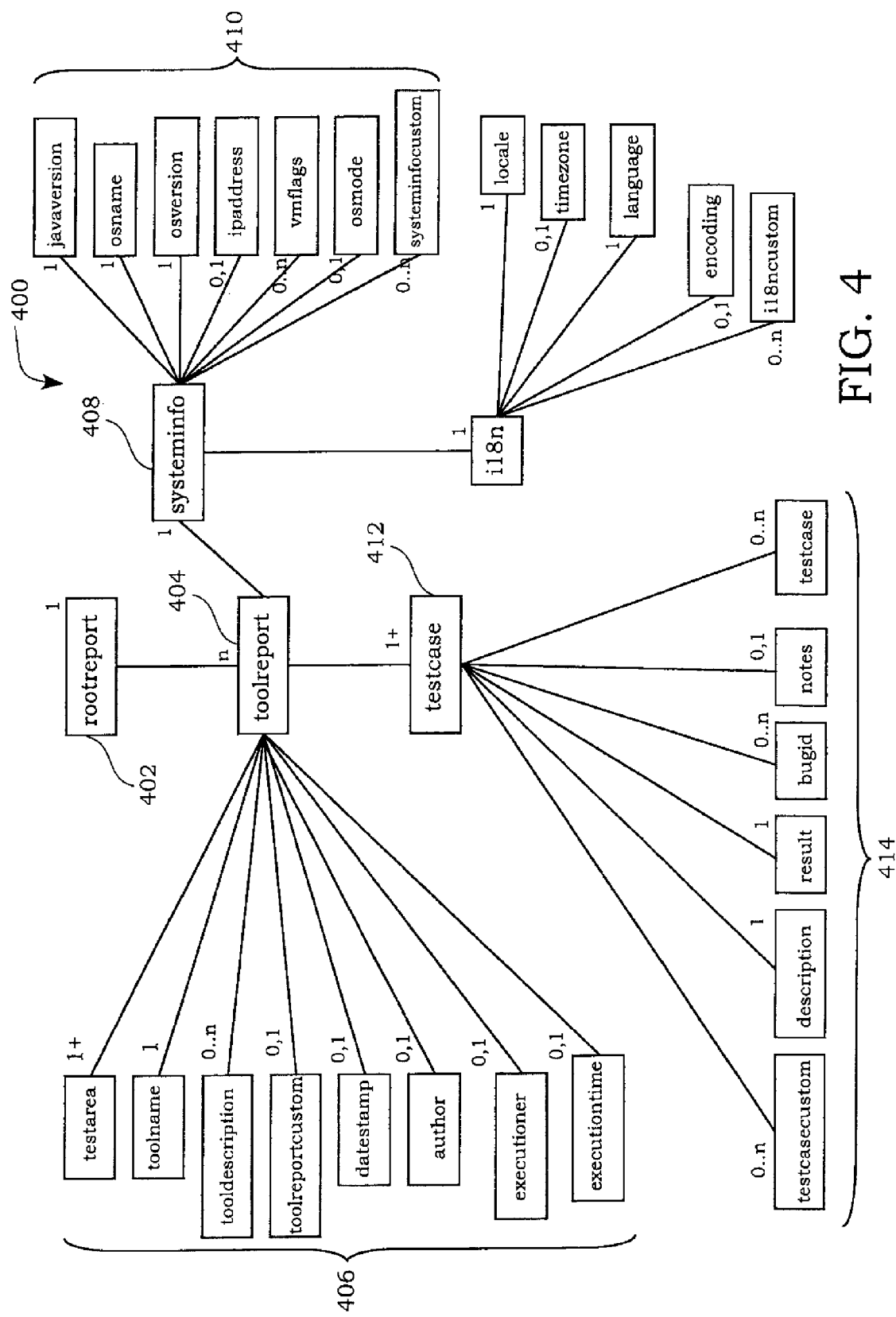
FIG. 4 is a diagram showing an exemplary test results DTD format for an XML test results file in graph form, in accordance with an embodiment of the present invention.

FIG. 4 is a diagram showing an exemplary test results DTD format 400 for an XML test results file in graph form, in accordance with an embodiment of the present invention. The test results DTD format 400 defines the XML format for an XML test results file in accordance with one embodiment of the present invention. In particular, the test results DTD format 400 includes a rootreport node 402 having a plurality of toolreport nodes 404 as child nodes, each toolreport node 404 providing information on a particular test application. Each toolreport node 404 includes a plurality of tool information nodes 406 as child nodes, each providing particular information regarding the test harness.

The toolreport node 404 further includes a child systeminfo node 408, which has a plurality of system child nodes 410 that provide particular information regarding the system used during testing. The toolreport node 404 further includes one or more testcase nodes 412 as child nodes. Each testcase node 412 is the parent of a plurality of test case information nodes 414 that provide specific information on the individual test case. It should be noted that the test results DTD format 400 shown in FIG. 4 is exemplary, thus other configurations for the test results DTD format can be used with the embodiments of the present invention depending on the needs of the test engineer.

The test results DTD format 400 is used by the XML reporter object to create well formed and valid XML test results files. FIG. 5 is a chart showing the exemplary test results DTD format 400' for an XML test results file in text format, in accordance with an embodiment of the present invention. As above, the exemplary test results DTD format 400' includes a rootreport tag 402 and a toolreport tag 404, which provides information on a particular test harness. Each toolreport tag 404 includes a plurality of tool information tags 406, each providing particular information regarding the test harness.

The toolreport tag 404 further includes a child systeminfo tag 408, which includes a plurality of system tags 410 that provide particular information regarding the system used during testing. In addition, the toolreport tag 404 includes one or more testcase tags 412. Each testcase tag 412 includes a plurality of test case information tags 414 that provide specific information on the individual test case. As above, it should be noted that the test results DTD format 400' shown in FIG. 5 is exemplary, thus other configurations for the test results DTD format can be used with the embodiments of the present invention depending on the needs of the test engineer.

Figure 6:
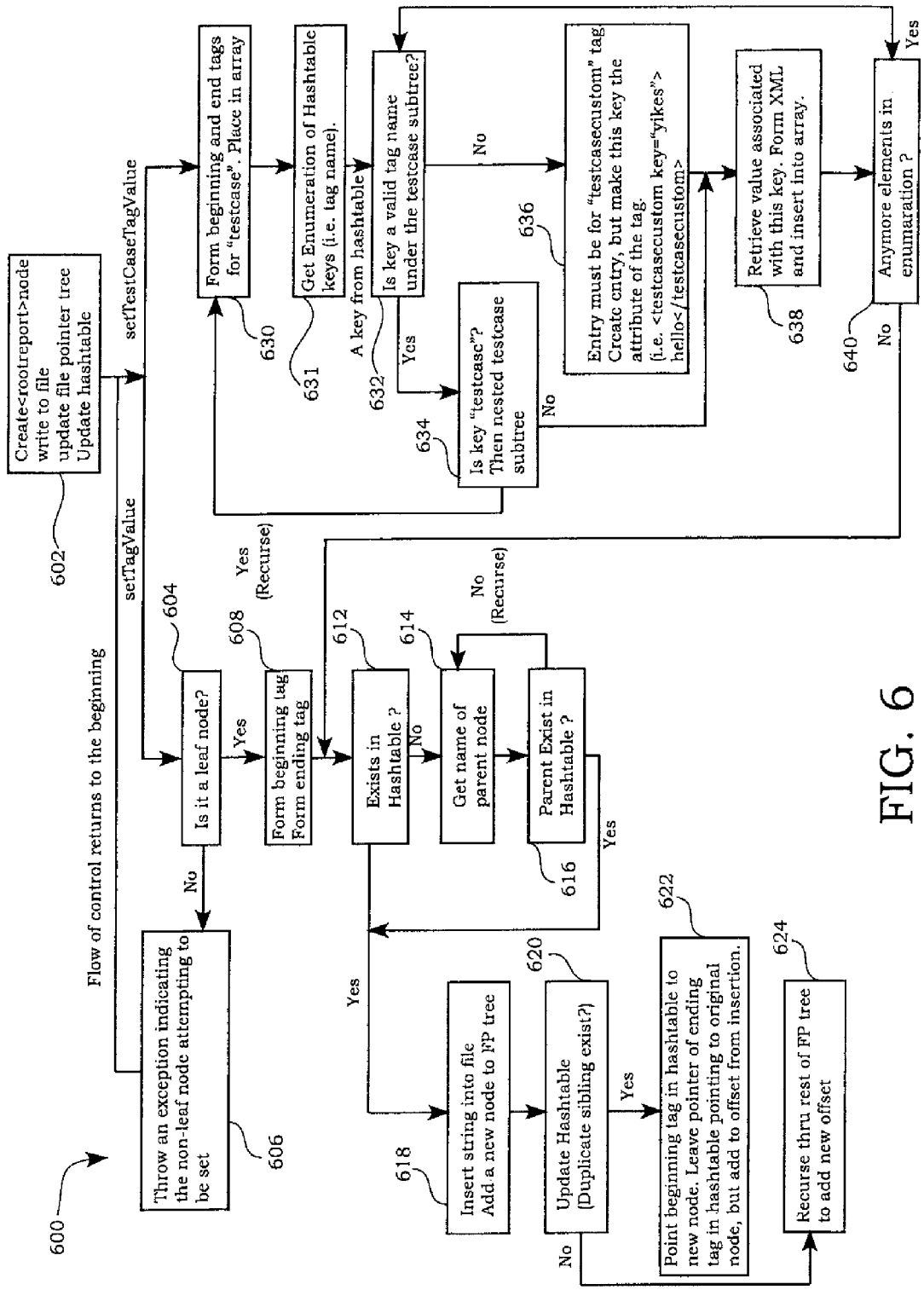
FIG. 6 is a flowchart showing a method for generating an XML tests results file, in accordance with an embodiment of the present invention.

FIG. 6 is a flowchart showing a method 600 for generating an XML tests results file, in accordance with an embodiment of the present invention. In particular, the method 600 illustrates how embodiments of the present invention create XML tests results files based on the test results DTD format described above, with reference to FIGS. 4 and 5.

In operation 602, the root node, <rootreport>, is created and the corresponding tags are written to the XML test results file. As mentioned previously, well formed and valid XML documents include one root tag, in this case rootreport. Hence, when using the test results DTD of FIG. 5, the first tags written to the XML test results file are the rootreport tags. In addition, the test results hash table and file pointer trees are updated, as discussed in greater detail next, with respect to FIGS. 7 and 8A.

Figure 7:
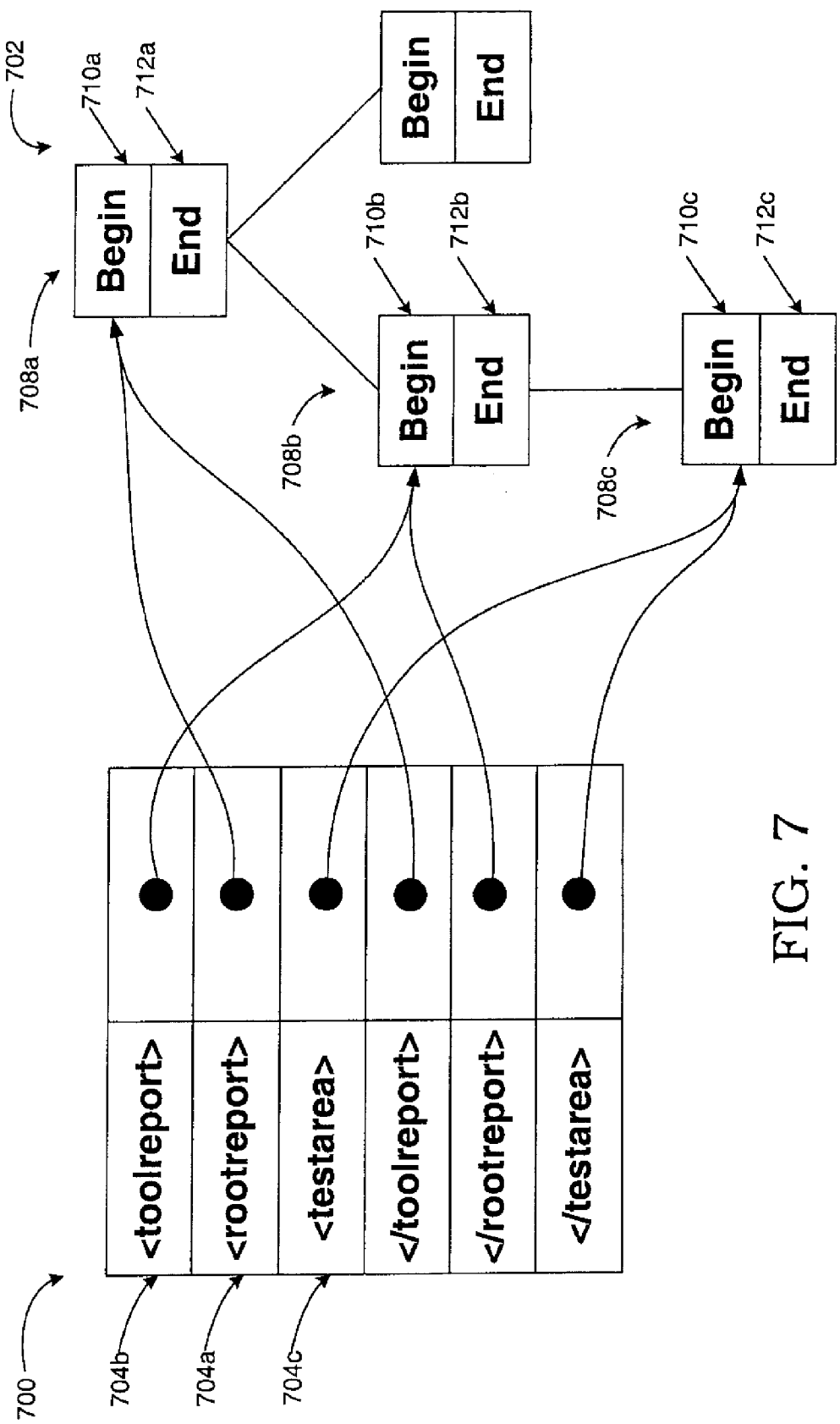
FIG. 7 is logical diagram showing an exemplary test results hash table and file pointer tree, in accordance with an embodiment of the present invention.

FIG. 7 is logical diagram showing an exemplary test results hash table 700 and file pointer tree 702, in accordance with an embodiment of the present invention. The test results hash table 700 includes a plurality of keys 704a-704c, each corresponding to a particular node pointer 706a-706c, which points to a particular node 708a-708c in the file pointer tree 702. During operation 602, the key <rootreport> 704a is processed by a hash function to obtain a table address to store the key <rootreport> 704a. In addition, a rootreport node 708a is created and addressed via the rootreport node pointer 706a corresponding to the key <rootreport> 704a. Also, the rootreport tags are written to the XML test results file.

FIG. 8A is an illustration showing an exemplary rootreport entry 800, in accordance with an embodiment of the present invention. As shown in FIG. 8A, the rootreport entry 800 includes a beginning tag <rootreport> 802a and an ending tag </rootreport> 802b. In addition, embodiments of the present invention keep track of the both the beginning position of information related to a particular tag and ending position of the tag. For example, the beginning position 710a of information related to the rootreport entry 800 is located after the beginning tag <rootreport> 802a. The ending position 712a of the rootreport entry is located at the end of the ending tag </rootreport> 802b.

Referring back to FIG. 7, the beginning position 710a of information related to the rootreport entry is stored in the rootreport node 708a. In the example of FIG. 8A, the beginning position 710a value is thirteen, which is the number of characters in the beginning tag <rootreport> 802a+1. In addition, the ending position 712a value is twenty-seven, which is the number of characters in both the beginning tag <rootreport> 802a and the ending tag </rootreport> 802b+1.

Referring back to FIG. 6, the method 600 branches depending on the particular XML reporter API called. If the set tag value API is called, the method 600 continues with operation 604. Otherwise, the method continues with operation 610. As mentioned above, the set tag value API is called using a key and a corresponding value, where the key is the tag that corresponds to the value being written. The set test case value API is called with a hash table having keys and values corresponding to a particular test case.

In operation 604, a decision is made as to whether the key value received corresponds to a leaf node, based on FIG. 4. As shown in FIG. 4, the test results DTD includes both leaf nodes, such as tool information nodes 406 and system child nodes 410, and non-leaf nodes, such as the toolreport node 404 and the systeminfo node 408. In one embodiment, the user is not allowed to set the values of non-leaf nodes, since these nodes are used primarily for organizational purposes rather than for data storage. Hence, if the key value received corresponds to a leaf node the method 600 continues with operation 608. Otherwise, the method 600 branches to operation 606.

In operation 606, an exception is raised indicating the non-leaf node attempting to be set. As mentioned above, the user generally is not allowed to set the values of non-leaf nodes because non-leaf nodes are used primarily for organizational purposes rather than for data storage. In this manner, the user is informed that an attempt has been made to set a non-leaf node value and program control returns to the calling application.

When the set test case value API is called using a hash table, the test case hash table is decoded, in operations 630-640. More particularly, in operation 630, begin and end tags for "testcase" are formed and inserted into the tests results file and a corresponding node is added to the file pointer tree. In operation 631, an enumeration of the hash table keys is obtained and, for each key, operations 632-640 are performed.

A decision is made as to whether the current key is a valid tag name under the testcase subtree, in operation 632. As mentioned previously, a DTD defines which keys are valid keys and where the valid keys can be located. Hence, the key is compared with the current DTD. If the current key is a valid tag name under the testcase subtree, the method 600 continues with operation 634. Otherwise, the method branches to operation 636.

In operation 634, a decision is made as to whether the current key is another "testcase" key. When the current key is another "testcase" key, there is a nested testcase subtree. Hence, if the current key is another "testcase" key, the method 600 recourses back to operation 630. Otherwise, the method 600 continues to operation 638.

When the current key is not a valid tag name under the testcase subtree, a custom test case tag is created in operation 636. Embodiments of the present invention use the "testcase-custom" tag to identify user created fields. In particular, a custom current key is entered as an attribute of the testcase-custom tag. That is, if the current key is "yikes," the custom entry could be <testcasecustom key="yikes">hello</testcasecustom>.

In operation 638, the value associated with the key is retrieved from the hash table. In addition, the XML entry is formed and inserted into the test results file. A decision is then made as to whether additional elements remain in the enumeration, in operation 640. If additional elements remain, the next key is processed starting with operation 632. Otherwise, the method 600 continues with operation 612.

Referring back to operation 604, if the key value received corresponds to a leaf node the XML reporter forms the beginning tag and the ending tag corresponding to the received key, in operation 608. For example, to set the test area to indicate "Swing," the set tag value API is called with the key "testarea" and the value "Swing." In this case, since the key "testarea" corresponds to a leaf node, the XML reporter forms the beginning tag <testarea> and the ending tag </testarea> in operation 608.

A decision is then made as to whether the key currently exists in the test results hash table, in operation 612. Referring to FIG. 7, when setting the key "testarea," the XML reporter processes the key "testarea" with a hash function to obtain a table address. This table address is then searched to determine whether the key "testarea" is currently present in the test results hash table 700. Continuing the above example from operation 602, the test results hash table 700 currently only contains the key "rootreport" 704a, thus the key "testarea" is not currently in the test results hash table 700. Referring back to FIG. 6, if the key currently exists in the test results hash table the method 600 continues with operation 618. Otherwise, the method 600 continues to operation 614.

When the key is not currently in the test results hash table, the XML reporter determines the name of the parent node, in operation 614. The parent node can be determined based on the test results DTD format shown in FIG. 4. Continuing with the above example, the XML reporter determines the parent node of the "testarea" node, which is the "toolreport" node 404.

A decision is then made as to whether the parent key exists in the test results hash table, in operation 616. For example, the XML reporter processes the key "toolreport," obtained in operation 614, with a hash function to obtain a table address. The XML reporter then searches the test results hash table 700 to determine whether the key "toolreport" is present at the table address. If the parent key exists in the test results hash table, the method 600 continues with operation 618. Otherwise, the method 600 recurses to operation 614 to determine the parent of the parent node.

In operation 618, the string comprising the tag and the value is inserted into the tests results file and a corresponding node is added to the file pointer tree. The string comprising the tag and the value includes a beginning tag followed by the value, if any, which is followed by the ending tag. This string is inserted at the beginning value 710 of the parent node. For example, when the parent of "toolreport," which is "rootreport" 704a, is found in the test results hash table 700, the string "<toolreport> </toolreport>" is inserted into the test results file, as shown in FIG. 8B.

FIG. 8B is an illustration showing an exemplary entry 800' including "toolreport," in accordance with an embodiment of the present invention. As shown in FIG. 8B, the string "<toolreport> </toolreport>" has been inserted into the test results file. In particular, the beginning tag <toolreport> 804a is inserted at position 710a, which is the begin value 710a stored in the rootreport node 708a. Following the beginning tag <toolreport> 804a is the ending tag </toolreport> 804b.

Referring back to FIG. 6, the test results hash table is updated, in operation 620. Referring to FIG. 7, the toolreport tag 704b is added to the test results hash table 700. In addition, the node pointer 706b corresponding to the toolreport tag is configured to point at the toolreport node 708b. A decision is then made as to whether the current tag is a duplicate tag, indicating a sibling node. If the current tag is a duplicate tag, the method 600 continues with operation 622. Otherwise, the file pointer tree is updated in operation 624.

When the current tag is a sibling tag, the node pointer for the begin tag in the hash table is set to point at the new node, in operation 622. In addition, the end value of the old node is updated. In particular, the begin value for the new node is set as described above. The end value for the old node is determined by adding the length of the new tag string.

The file pointer tree 702 is updated, in operation 624, using a preorder traversal to update the begin values 710a-710c, and a post order traversal to update the end values 712a-712c starting from the new node. Continuing with the above example, the file pointer tree 702 currently includes the rootreport node 708a and the newly added "toolreport" node 708b. Thus, the XML reporter updates the file pointer tree 702 starting at the toolreport node 708b. The begin value 710b of the toolreport node 708b is updated to indicate the ending position of the beginning tag <toolreport> 804a. In addition, the end value 712b of the toolreport node 708b is updated to indicate the ending position of the ending tag </toolreport> 804b. Finally, the end value 712a of the rootreport node 708a is updated to indicate the new ending position of the ending tag </rootreport> 802b. Note, because the XML reporter started with the newly added node, in this case the toolreport node 708b, the begin value 710a of the rootreport node 708a remains unchanged.

The method then returns from any recursive calls and continues to process those method calls, thus returning to operation 616 of the previous method call. Continuing with the above example, the method 600 returns from processing the "toolreport" call to continue processing the "testarea," which was the original call to the method 600. Since, the parent of "testarea" is now in the test results hash table 700, the method 600 continues to operation 618 and inserts the "testarea" tags and related value into the test results file.

FIG. 8C is an illustration showing an exemplary entry 800" including "testarea," in accordance with an embodiment of the present invention. As shown in FIG. 8C, the string "<testarea>Swing</testarea>" has been inserted into the test results file. In particular, the beginning tag <testarea> 806a is inserted at position 710b, which is the begin value 710b stored in the toolreport node 708b. Following the beginning tag <testarea> 806a is the value "Swing" 808, followed by the ending tag </testarea> 806b.

Referring to FIG. 7, the testarea tag 704c is added to the test results hash table 700. In addition, the node pointer 706c corresponding to the testarea tag 704c is configured to point at the testarea node 708c. The file pointer tree 702 is updated, in operation 624, starting from the testarea node 708c. Continuing with the above example, the file pointer tree 702 currently includes the rootreport node 708a, the toolreport node 708b, and the newly added testarea node 708c. Thus, the XML reporter updates the file pointer tree 702 starting at the testarea node 708c. The begin value 710c of the testarea node 708c is updated to indicate the ending position of the beginning tag <testarea> 806a. In addition, the end value 712c of the testarea node 708c is updated to indicate the ending position of the ending tag </testarea> 806b. Further, the end value 712b of the toolreport node 708b is updated to indicate the new ending position of the ending tag </toolreport> 804b, and the end value 712a of the rootreport node 708a is updated to indicate the new ending position of the ending tag </rootreport> 802b. Note, because the XML reporter started with the newly added node, in this case the testarea node 708c, the begin values 710a of the rootreport node 708a and the toolreport node 708b remain unchanged.

Figure 9:
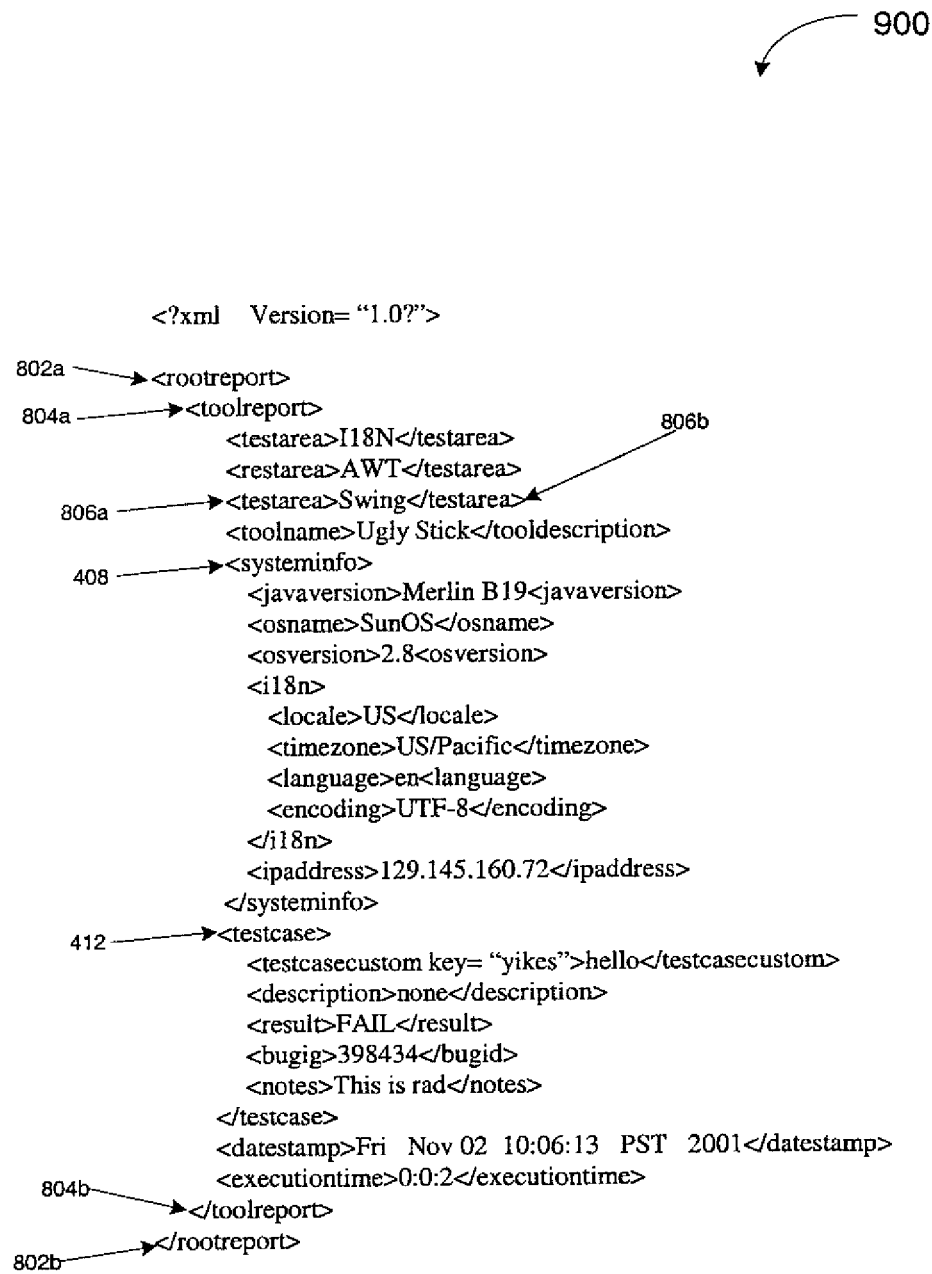
FIG. 9 is an exemplary test results file, in accordance with an embodiment of the present invention.

FIG. 9 is an exemplary test results file 900, in accordance with an embodiment of the present invention. As shown in FIG. 9, the exemplary test results file 900 includes the rootreport beginning and ending tags 802a and 802b, the toolreport beginning and ending tags 804a and 804b, and the testarea beginning and ending tags 806a and 806b, described above with reference to FIG. 8. In addition, the test results file 900 illustrates a file configuration having additional information, such as system information 408 and test case information. In this manner, embodiments of the present invention generate test report files capable of being viewed in multiple fashions using the same test report file. Further, the real-time writing reduces the impact of system crashes that occur during of testing.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating an extensible markup language (XML) test result file, comprising the operations of:

receiving a key parameter and a value parameter, wherein the key parameter relates to a tag;

generating a first string based on the key parameter and the value parameter, wherein the first string includes a first beginning tag and a first ending tag based on the key parameter, and wherein the first string includes the value parameter positioned between the first beginning tag and the first ending tag; and inserting the first string into a test results file storing a second string having a second beginning tag and a second ending tag, wherein the first string is inserted between the second beginning tag and a second ending tag, wherein the test results file includes results for one or more coded test cases, and wherein each operation of the method is executed by a computer.

2. A method as recited in claim 1, wherein the first beginning tag and the first ending tag are based on a document type definition (DTD).

3. A method as recited in claim 1, further comprising the operation of creating a test results hash table that stores key parameters related to the test results file.

4. A method as recited in claim 3, further comprising the operation of generating a file pointer tree having a plurality of nodes, each node referenced by a node pointer in the test results hash table.

5. A method as recited in claim 4, wherein each node stores a begin value and an end value related to a particular key.

6. A method as recited in claim 5, wherein the begin value indicates a file position after a corresponding beginning tag related to the particular key, and wherein the end value corresponds to a file position after a corresponding ending tag related to the particular key.

7. A method as recited in claim 6, wherein the begin value and the end value facilitate inserting the first string into the second string.

8. A computer program, which is executable, embodied in a non-transitory computer readable medium for generating an extensible markup language (XML) test result file, comprising:
   a code segment that receives a key parameter and a value parameter, wherein the key parameter relates to a tag;
   a code segment that generates a first string based on the key parameter and the value parameter, wherein the first string includes a first beginning tag and a first ending tag based on the key parameter, and wherein the first string includes the value parameter positioned between the first beginning tag and the first ending tag; and
   a code segment that inserts the first string into a test results file storing a second string having a second beginning tag and a second ending tag, wherein the first string is inserted between the second beginning tag and a second ending tag and wherein the test results file includes results for one or more coded test cases.

9. A computer program as recited in claim 8, wherein the first beginning tag and the first ending tag are based on a document type definition (DTD).

10. A computer program as recited in claim 8, further comprising a code segment that creates a test results hash table for storing key parameters related to the test results file.

11. A computer program as recited in claim 10, further comprising a code segment that generates a file pointer tree having a plurality of nodes, each node referenced by a node pointer in the test results hash table.

12. A computer program as recited in claim 11, wherein each node stores a begin value and an end value related to a particular key.

13. A computer program as recited in claim 12, wherein the begin value indicates a file position after a corresponding beginning tag related to the particular key, and wherein the end value corresponds to a file position after a corresponding ending tag related to the particular key.

14. A computer program as recited in claim 13, wherein the begin value and the end value facilitate inserting the first string into the second string.

* * * * *